(12) United States Patent
Stokes, Jr.

(10) Patent No.: US 7,331,278 B2
(45) Date of Patent: Feb. 19, 2008

(54) SYSTEM FOR A GAS GRILL THAT ALLOWS IT TO COOK FATTY AND SLOW COOKING MEATS

(76) Inventor: Elbert Harvey Stokes, Jr., 288 Vaughn Rd., Glenwood, AR (US) 71943

( * ) Notice: Subject to any disclaimer, the term of this patent is extended or adjusted under 35 U.S.C. 154(b) by 88 days.

(21) Appl. No.: 11/268,987

(22) Filed: Nov. 7, 2005

(65) Prior Publication Data
US 2007/0006743 A1    Jan. 11, 2007

(51) Int. Cl.
A47J 37/00 (2006.01)
A47J 27/00 (2006.01)

(52) U.S. Cl. .............................. 99/401; 99/446; 99/482

(58) Field of Classification Search ................. 99/400, 99/401, 446, 447, 444, 482; 126/369, 25 R, 126/27, 9 R; 219/201, 401, 429, 443.1
See application file for complete search history.

(56) References Cited

U.S. PATENT DOCUMENTS

| | | | |
|---|---|---|---|
| 3,851,639 A | | 12/1974 | Beddoe |
| D244,249 S | | 5/1977 | Boswell et al. |
| 4,094,295 A | | 6/1978 | Boswell et al. |
| 4,554,864 A | | 11/1985 | Smith et al. |
| 4,721,037 A | | 1/1988 | Blosnich |
| 4,823,684 A | * | 4/1989 | Traeger et al. ............. 99/447 |
| 4,869,163 A | * | 9/1989 | Haskins ..................... 99/482 |
| 5,501,142 A | | 3/1996 | Bailey |
| 5,566,607 A | * | 10/1996 | Schleimer ................. 99/446 |
| 5,584,235 A | * | 12/1996 | DuBois et al. ............. 99/413 |
| 5,653,161 A | * | 8/1997 | Nopanen et al. ........... 99/415 |
| 5,653,162 A | | 8/1997 | Lunde |
| 5,682,811 A | * | 11/1997 | Kidushim .................. 99/400 |
| 5,718,165 A | * | 2/1998 | Winstead ................... 99/400 |
| 5,768,983 A | | 6/1998 | Treiber |
| 5,891,498 A | | 4/1999 | Boehler |
| 6,000,319 A | | 12/1999 | Treiber |
| D423,280 S | | 4/2000 | Lin |
| 6,102,028 A | | 8/2000 | Schlosser et al. |
| 6,626,090 B2 | | 9/2003 | McLemore et al. |
| 6,708,604 B1 | | 3/2004 | Deichler, Jr. |
| 6,840,159 B1 | * | 1/2005 | Li ............................ 99/337 |
| 6,840,160 B2 | * | 1/2005 | Hall .......................... 99/339 |
| 6,869,629 B2 | * | 3/2005 | Tiernan .................... 426/243 |
| 7,007,592 B2 | * | 3/2006 | Citrynell et al. ........... 99/347 |
| 2003/0213378 A1 | | 11/2003 | Farrow |
| 2003/0217647 A1 | | 11/2003 | Jones |
| 2004/0216622 A1 | | 11/2004 | Martin |

FOREIGN PATENT DOCUMENTS

GB       2 225 208 A        5/1990
WO       WO 91/03972 A1    4/1991

* cited by examiner

Primary Examiner—Reginald L. Alexander

(57) ABSTRACT

A single free standing apparatus which is operable in conjunction with any number of well known grills to permit preparation of a greatly enhanced foodstuff. The apparatus simultaneously accumulates and causes vaporization of grease and fatty liquids, while enhancing flavor by enveloping the foodstuff in a flavor enhancing aroma, all while spreading heat in a more uniform manner to avoid hot spots on the food stuff.

7 Claims, 2 Drawing Sheets

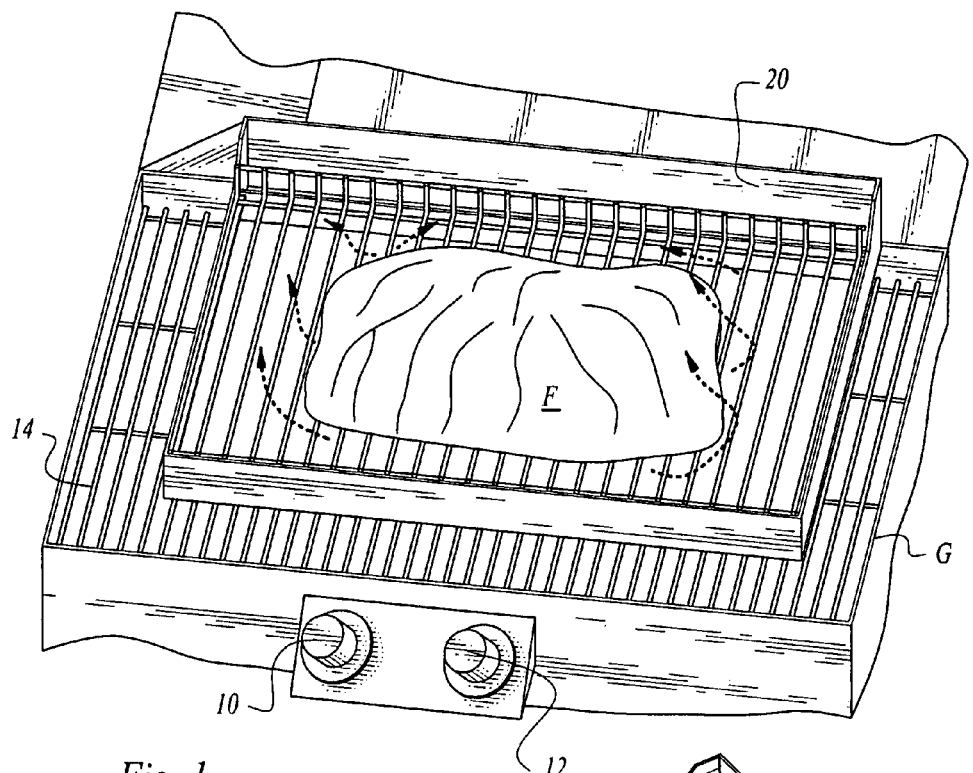
Fig. 1
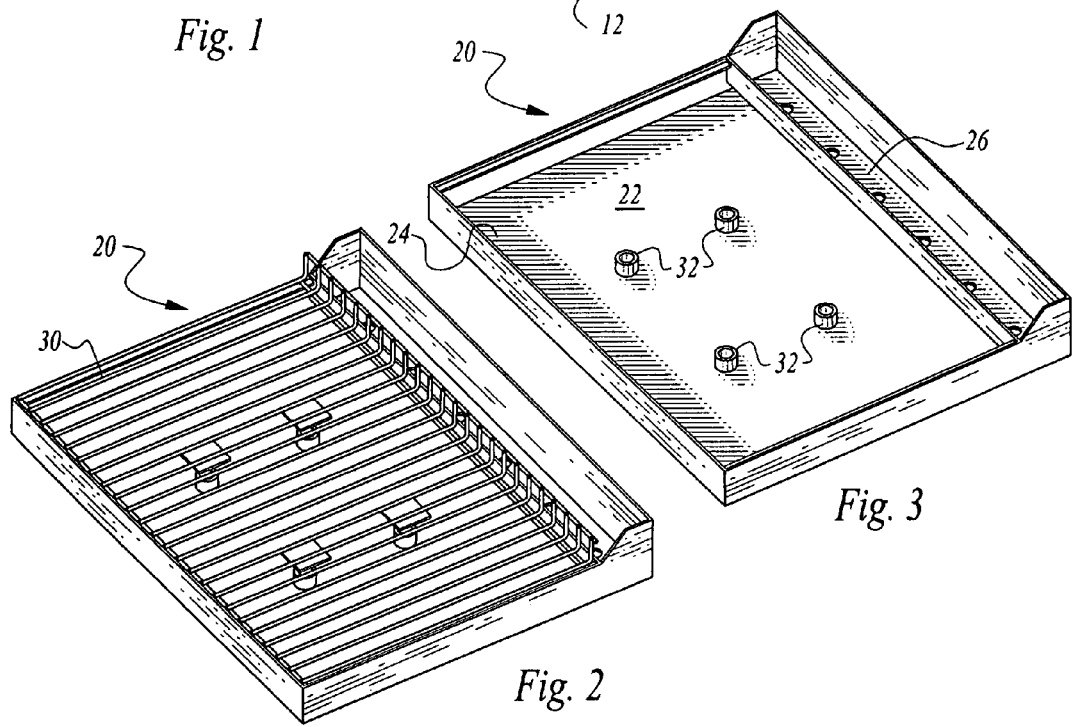
Fig. 2
Fig. 3

SYSTEM FOR A GAS GRILL THAT ALLOWS IT TO COOK FATTY AND SLOW COOKING MEATS

BACKGROUND

Gas grills have become very popular in the last few years. You have a quick clean way to grill food, but it is very hard to cook large pieces of meat and cook fatty cuts without flame-ups and burning the meat or having to tend the food frequently. This system allows you to cook slowly in moist, smoky conditions without fear of flames and cooks very slowly if needed. The food will be moist. It will have a good smoky taste and the slow cooking insures the meat will be tender.

BRIEF SUMMARY

The apparatus has two components, the large one holds seasonings and water, and it has four drains that allow you to add liquid and the meat drippings and seasonings drain on the burners that create aromatic smoke and steam. This adds flavor and moisture to the meat. The invention moistens the meat instead of drying it out.

The second compartment holds wood chips and has holes in the bottom, which allows the heat to go through the chips and creates smoke and adds flavor to the meat. Also, when seasoning and drippings hit the burners, the smoke and steam go through the holes and that adds even more flavor.

BRIEF DESCRIPTION OF THE SEVERAL VIEWS OF THE DRAWING

FIG. 1 is a perspective view of the apparatus of the present invention as it would appear to the chef during the cooking process;

FIG. 2 is a perspective view of the apparatus of FIG. 1, illustrating the apparatus as it would appear isolated from the grill;

FIG. 3 is a view similar to that of FIG. 2, with the catch pan shown in some considerable detail, with the grillwork removed;

DETAILED DESCRIPTION OF THE INVENTION

Figure 4:
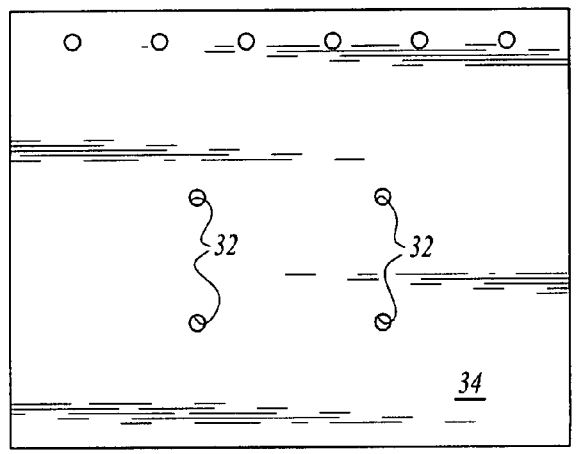
FIG. 4 is a bottom view of the apparatus of FIG. 2.

With reference now to the drawings, and initially to FIG. 1, the environment within which the present invention has particular, although not exclusive, utility is shown.

The working portion of a grill is depicted at G and is intended to be representative of any number of back yard and patio type grill designs. The grill includes heating controls 10 and 12 and a platen 14, of generally well known construction is provided above the heating elements H [FIG. 5].

The apparatus which comprises the invention is shown at 20, in repose atop the platen 14. The apparatus 20, in its simplest form, comprises a catch pan 22, best seen in FIG. 3. While it is shown as rectangular, it may be of any suitable shape, and its depth is a matter of choice.

In keeping with the invention, the catch pan 22 is divided into segments. First, there is a relatively large segment, or reservoir, 24. The reservoir 24 is, in use, filled with water to an appropriate level where it will evaporate to keep foodstuffs moist while it is positioned to catch grease and fatty liquids generated by the cooking of a food stuff F. The grease and fatty liquids, being non solubles in water, will, therefore, remain in a layer on the top of the body of water.

A second segment, or flavor enhancer, 26, typically smaller than the reservoir 24, is positioned, as shown in FIG. 2, at the rear of the reservoir 26 and is intended to receive and house aromatic materials, e.g., wood chips which, when heated by the grill, add to the cooking process by adding flavor to the foodstuffs. A drain 28 is provided to avoid an accumulation of waste liquid. The catch pan 22 is spanned by a grillwork 30, upon which the foodstuff F is placed for cooking.

The apparatus contemplates further enhancements to the foodstuff during the cooking process. More particularly, as grease and fatty liquids fall into the reservoir, the initial water level rises. In order to accommodate this rise in a neat and efficient manner, overflow relief in the nature of stand pipes 32 are provided. The stand pipes 32 are tubular and are secured to the bottom 34 of the pan 22. While four are shown, any appropriate number may be employed without departure from the invention. The top of each stand pipe is open and are of such height that as the level of the water rises, the layer of grease and fatty liquids fall through the stand pipes and on to the heating elements, where it is vaporized. The vapors envelope the foodstuff and add further to its flavor.

Yet another enhancement is contemplated by the addition of heat sinks 38 which are attached to the underside of the grill work 30. The heat sinks tend to spread the heat more uniformly and avoid hot spots. As a consequence, the foodstuffs being prepared are cooked more uniformly and evenly.

Figure 5:
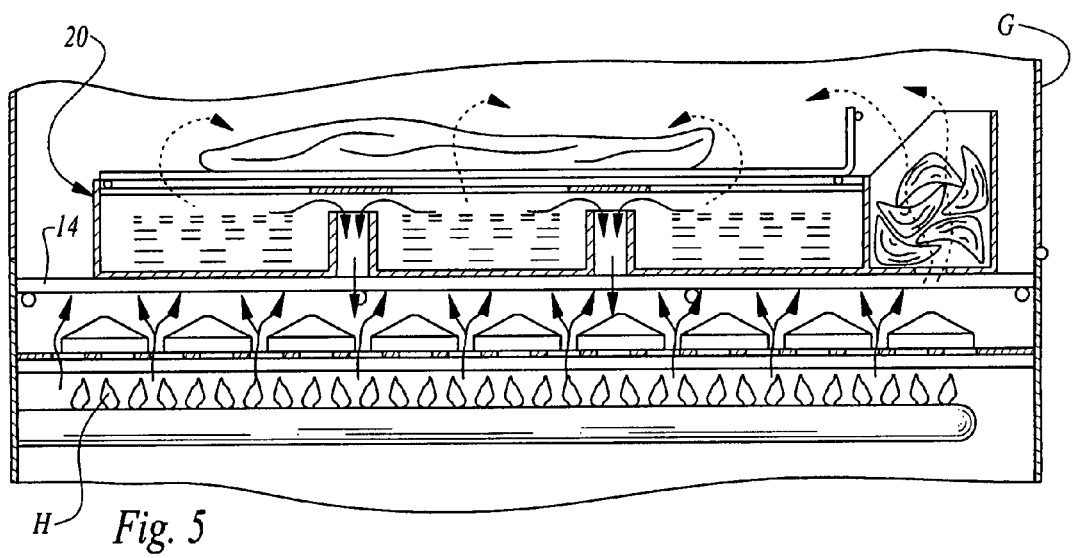
FIG. 5 is a side elevation, sectioned along a vertical plane, for the grill of FIG. 1, with the apparatus in place and the cooking process in progress.
Figure 6:
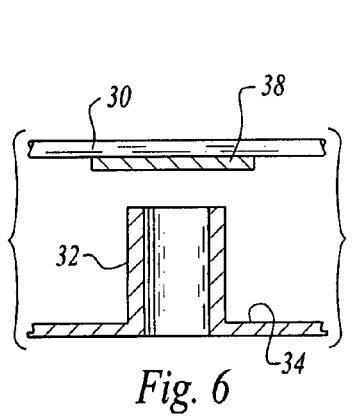
FIG. 6 is a partial sectional view of the apparatus specifically focused on the drain system of the present invention.
Figure 7:
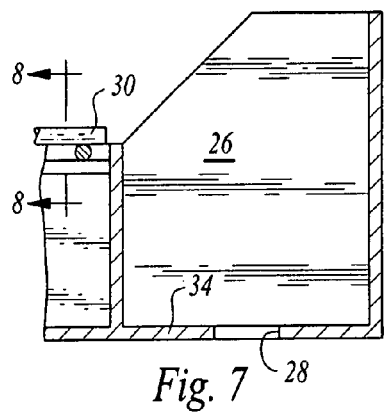
FIG. 7 is a partial sectional view of the apparatus which is focused on the rear compartment in which flavor enhancements are provided; and, FIG. 8 is a partial sectional view taken along lines 8-8 of FIG. 7.
Figure 8:
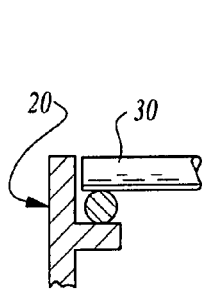

Referring now to FIG. 5, the heating patterns are demonstrated. Heat from the heating elements H permeate the water in the reservoir, and that heat rises to prepare the foodstuff F. Simultaneously, wood chips W, or the like, in the segment 32 are heated and give off a pleasant aroma which likewise permeates the foodstuff F. As further seen by the arrows, grease and fatty liquids accumulated on the surface of the water are drained to the base of the grill and on to the heating elements which then vaporizes that waste material. The resultant vapors, of course, further enhance the flavor imparted to the foodstuff.

It will now be appreciated that the free standing apparatus of the present invention provides, in a single package, a highly desirable package of enhancements achieved by the apparatus of the present invention, whereby meats may be smoked, and fish and vegetables may be steamed. One may even bake a cake and cook roasts, hams and turkeys. Indeed, complete meals may be prepared. By virtue of its separateness it is readily cleaned and stored when not in use.

While those skilled in the art may perceive minor variations in the apparatus, such variations are within the contemplation of the invention as described by the forthcoming claims, wherein:

The invention claimed is:

1. An apparatus for use with a cooking grill for preparing foodstuffs, said apparatus comprising a catch pan, said catch pan defining a reservoir segment said aroma enhancing segment extending along a rear side of said catch pan and being separated from said reservoir by an upstanding wall which runs along a length of the reservoir; and an aroma enhancing segment;

said reservoir being filled with water to a suitable level, and said aroma enhancing segment adapted to receive an aromatic material;

said catch pan being covered above said reservoir segment by a grillwork, said grillwork supporting a foodstuff to be prepared;

the cooking grill adapted to heat said catch pan whereby water said reservoir catches grease and fatty liquids on the top surface thereof, said aroma enhancing materials being heated as well by said cooking grill so as to give off an aroma intended to permeate said food stuff to thereby enhance the flavor thereof.

2. The apparatus of claim 1, wherein at least one standpipe is provided upstanding from said reservoir, said stand pipes being open to drain off grease and fatty liquids accumulated on the surface of the water in said reservoir and direct the same to the grill.

3. The apparatus of claim 1, wherein at least one heat sink is provided to spread the heat from the grill evenly over said grill work.

4. The apparatus of claim 2, wherein at least one heat sink is provided to spread the heat from the grill evenly over said grill work.

5. The apparatus of claim 1, wherein said apparatus is free standing and removable from the grill for cleaning and storage.

6. The apparatus of claim 1, wherein said aroma enhancing segment is provided with a drain at the bottom thereof.

7. The apparatus of claim 3, wherein said heat sink being attached to the underside of said grillwork.

* * * * *